United States Patent [19]

Koshino et al.

[11] Patent Number: 4,698,754
[45] Date of Patent: Oct. 6, 1987

[54] ERROR DETECTION OF SCAN-OUT IN A DIAGNOSTIC CIRCUIT OF A COMPUTER

[75] Inventors: Minoru Koshino, Yokohama; Yasuo Matsumoto, Ebina, both of Japan

[73] Assignee: Fujitsu Limited, Kawaski, Japan

[21] Appl. No.: 507,495

[22] Filed: Jun. 24, 1983

[30] Foreign Application Priority Data

Jun. 25, 1982 [JP] Japan ............................ 57-109605

[51] Int. Cl.⁴ ........................................... G06F 11/10
[52] U.S. Cl. ................................................... 364/200
[58] Field of Search ... 364/200 MS File, 900 MS File

[56] References Cited

U.S. PATENT DOCUMENTS

| 4,167,780 | 9/1979 | Hayashi | 364/200 |
| 4,335,425 | 6/1982 | Goto | 364/200 |
| 4,486,883 | 12/1984 | Kanai | 371/67 |

Primary Examiner—Archie E. Williams, Jr.
Assistant Examiner—Emily Y. Chan
Attorney, Agent, or Firm—Staas & Halsey

[57] ABSTRACT

A data processing system provides a diagnostic circuit having a scan-out function, that includes error checking. A scan-out address check code is generated by a sending unit and another scan-out address check code is generated by a receiving unit. The scan-out address check codes are compared in the sending unit, and an error in the scan-out operation can be detected.

6 Claims, 4 Drawing Figures

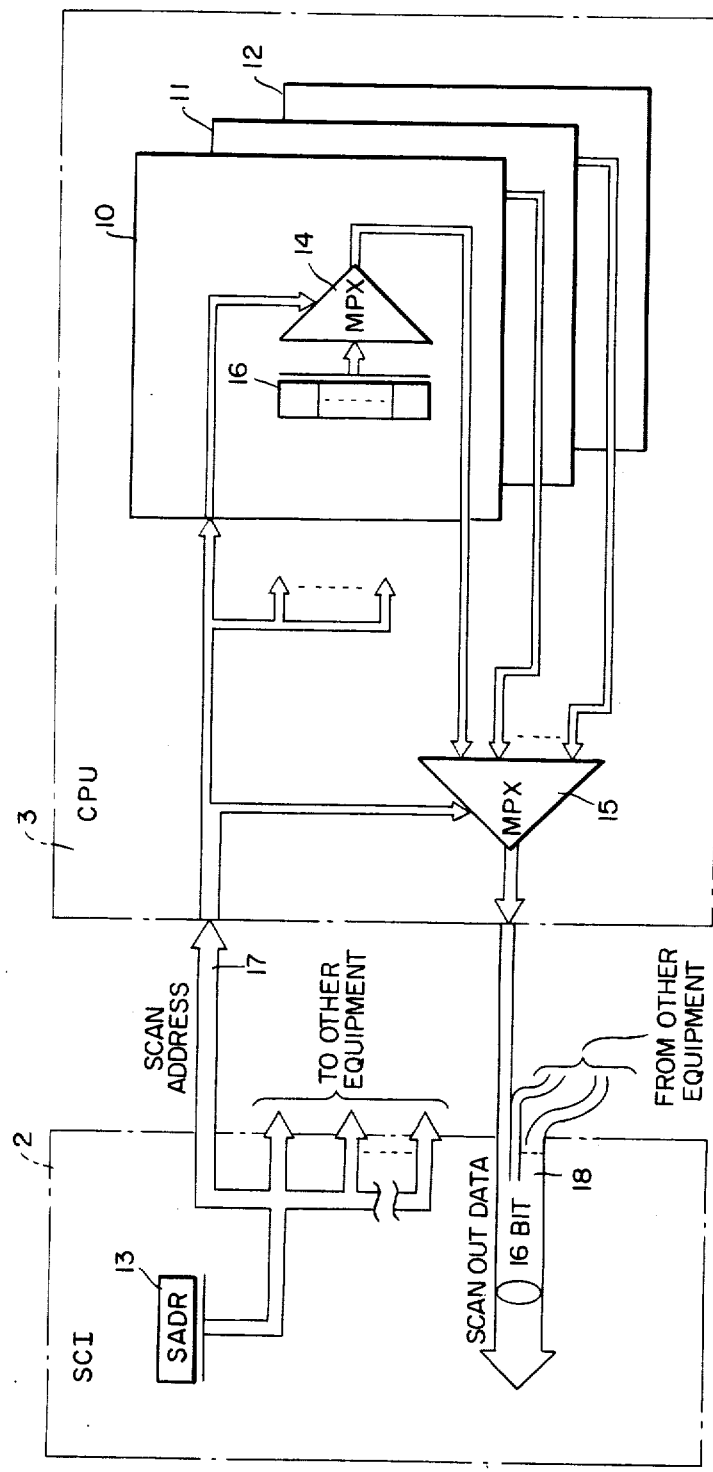

ERROR DETECTION OF SCAN-OUT IN A DIAGNOSTIC CIRCUIT OF A COMPUTER

BACKGROUND OF THE INVENTION

1. Field of the Invention

This invention relates to a diagnostic circuit of a data processing system and more specifically to an error detection system of a diagnostic circuit utilizing a scan-out function.

2. Description of the Prior Art

There is a scan-out function for outputting and displaying the internal condition of the circuits of various devices of a computer system. In order to use the scan-out function, an address is transferred to a flip-flop, gate or the like in a scan circuit in the target device. The address has a number of bits sufficient to select all the circuits in the devices, such as flip-flops and gates etc. The state of the desired circuits can be output by using the address to produce a combination of selection signals. Conditions of all of the circuits can be output by sequentially updating. The circuit condition is displayed or recorded if an error is generated, or used as instruction control information in an alternative use of the condition.

FIG. 1 outlines an example of structure of a computer system providing the scan-out function. Block 1 is a service processor (SVP), 2 is a system console interface unit (SCI), 3 is a central processing unit (CPU), 4 is a channel processor (CHP), 5 is a memory control unit (MCU) and 6 is a main memory unit (MSU).

The SCI 2 is provided with a scan-out control circuit and the CPU3, CHP4, MCU5 and MSU6 are provided with a scan-out circuit. The SCI 2 itself is also provided with a scan-out circuit. Each unit receives a plurality of selection signals selecting its scan-out circuits and sends to SCI 2 scan-out data indicating the condition of the scan-out circuit having the address designated a combination of the selection signals. The SVP 1 generates address of the circuit to be scanned, then sends it to SCI 2 in order to initiate execution of the scan-out control by SCI 2. Simultaneously, SCI 2 receives data output from the scan-out circuit which it passes on to be used in accordance with application purposes.

The SCI 2 is provided between SVP1 and CPU3, CHP4, MCU5 and MSU6 and has the function of controlling the transmission of the scan-out address and relaying output data from the scan-out circuit to the SVP 1. The SVP 1 is used for displaying the output of the scan-out circuit on a display unit, printing it with a printer, recording it in a file or for alternative control of instructions.

In a recent computer system, data output by the scan-out circuit is important information used for identifying the defective area of a failure occurs in the computer system. If the data is erroneous, one problem is that adequate or proper maintenance becomes impossible. Also, since such output can be used as control information by an instruction, if there is an error in the data, the result of the execution of the instruction is unpredictable and may cause serious problems.

SUMMARY OF THE INVENTION

This invention has an object of preventing the use of unwanted or useless scan-out data resulting from an error in the scan-out address, thereby adequate maintenance of the data processing system can be provided.

In order to attain such an object, this invention provides a data processing system which includes a first unit for sending a scan-out address selecting a circuit to be diagnosed and a second unit which includes the circuit to be diagnosed and sends to the first unit the condition of the circuit to be diagnosed selected by the scan-out address. The first unit generates error check information on the basis of the scan-out address sent to the second unit. The second unit generates error check information on the basis of the scan-out address received from the first unit and sends the error check information to the first unit. The first unit compares its error check information with the error check information from the second unit and generates an error signal if they don't match.

BRIEF DESCRIPTION OF THE DRAWINGS

FIG. 2 is a block diagram of a scan address line and a scan-out data line;

DESCRIPTION OF THE PREFERRED EMBODIMENT

Figure 1:
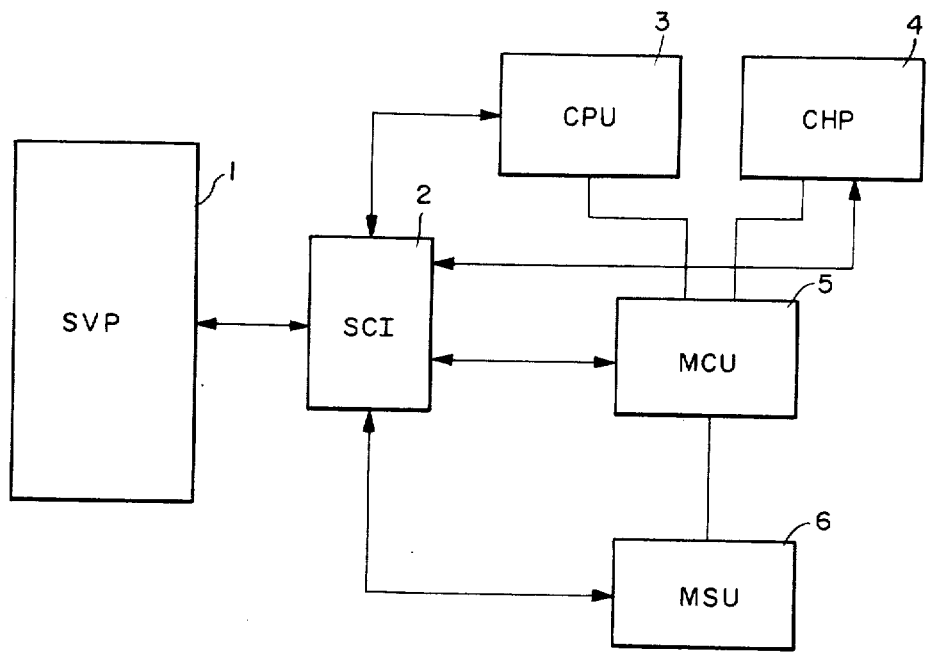
FIG. 1 is a block diagram of a computer system having a scan-out function.

FIG. 1 is an example of the configuration of a computer system which has a scan-out function as described above. In this figure, 1 is a service processor (SVP), 2 is a system console interface unit (SCI), 3 is a central processing unit (CPU), 4 is a channel processor (CHP), 5 is a memory control unit (MCU) and 6 is a main memory unit (MSU).

FIG. 2 is an example of the structure of a scan address line and a scan-out data line. In this figure, 2 is an SCI, 3 is a CPU, 10 to 12 are scan dividing circuits, 13 is a scan (or scan-out) address register (SADR), 14 and 15 are multiplexers (MPX), 16 is a flip-flop group or gate circuit group to be scanned, 17 is a scan address line and 18 is a scan-out data line.

Figure 4:
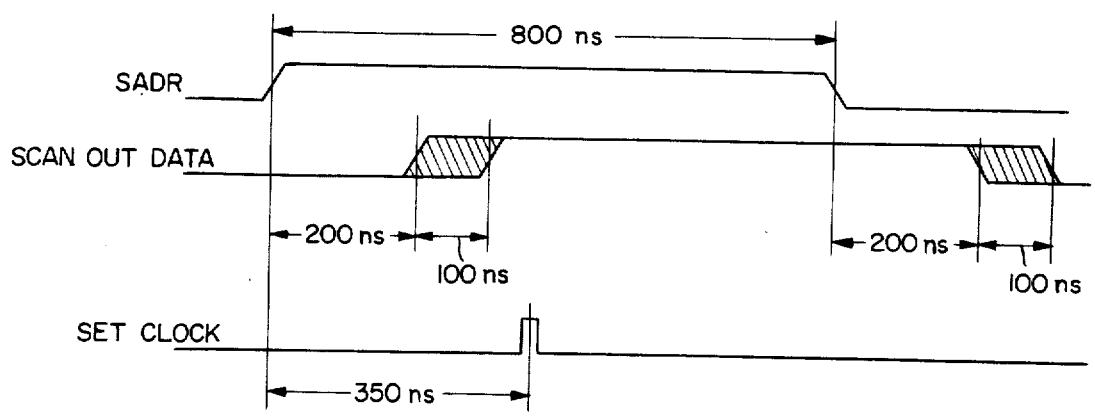
FIG. 4 is a timing diagram for the embodiment in FIG. 3.
Figure 3:
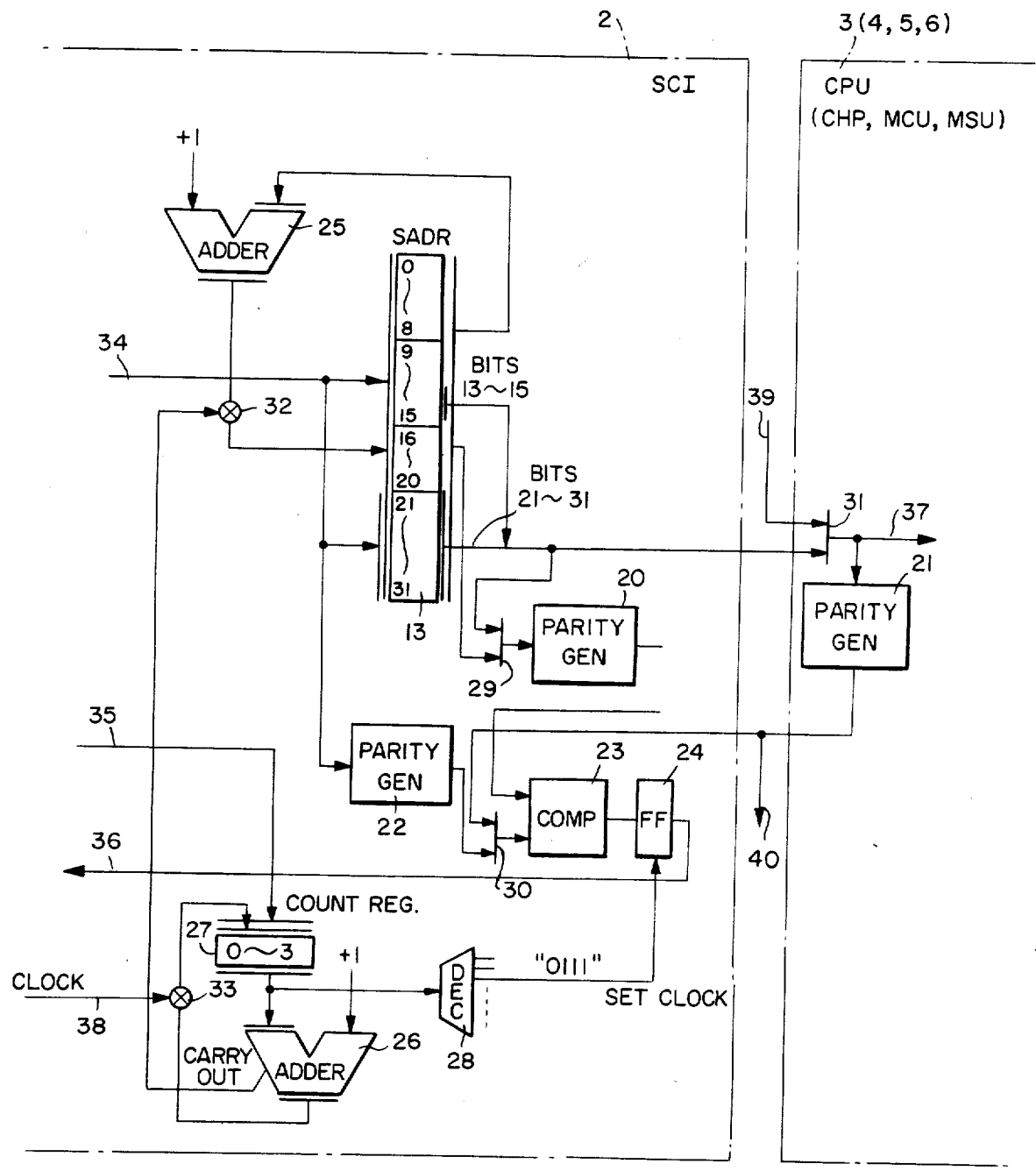
FIG. 3 is a block diagram of an embodiment of the invention supplying more details for the blocks in FIG. 2.

FIG. 3 is a block diagram of an embodiment of this invention. In this figure, 2 to 6 and 13 are the same as those shown in FIG. 1 and FIG. 2. Reference numerals 20 to 22 are parity generators, 23 is a comparator, 24 is a flip-flop, 25 and 26 are adders, 27 is a count register, and 28 is a decoder. Reference numerals 29 to 31 are switching gate circuits, 32 and 33 are control gate circuits, 34 is an initial setting address line, 35 is a count value initial setting line, 36 is an error signal line, 37 is a scan address line, and 38 is a clock signal line. Reference numeral 39 is a scan address line extended from an other SCI and 40 is a parity bit signal line to another SCI. These two lines 39 and 40 are provided if there are two SCI's in the computer system. FIG. 4 is a time chart of an embodiment illustrated in FIG. 3.

The scan-out operation will first be described by referring to FIG. 1 and FIG. 2. The SVP 1 shown in FIG. 1 sends a scan-out address to SCI 2 in order to read scan-out data. This scan-out address is written into the SADR 13 in SCI 2 and then sent to CPU 3 and other units.

Thereafter, for example in CPU 3, part of the bits of the scan-out address are input to the multiplexer 15, which selects one of the scan dividing circuits 10 to 12. The other part of the bits of the scan-out address are input to a multiplexer 14 in each scan dividing circuit 10 to 12, thereby selecting the flip-flop group or gate group 16 in the scan dividing circuits 10 to 12. Contents of designated circuits to be diagnosed are sent to SCI 2 as scan-out data. This scan-out data is further sent to SVP 1 from SCI 2.

An embodiment of this invention will be described by referring to FIG. 3. First, the scan address data is written into the scan address register (SADR) from SVP 1 through the initial setting addresss line 34. Simultaneously, the contents of the count register 27 is initially set (for example, at all "0's") by the count value initial setting line 35. The data in the scan address register (SADR) 13 is input to the parity generator 20 via the switching gate circuit 29 and a corresponding parity bit is generated. This parity bit is then input to one input of the comparator 23. Meanwhile, the data sent from SVP 1 through the initial setting address line 34 is input to the parity generator 22 and a corresponding parity bit is generated. This parity bit is input to the other input of comparator 23. The comparator 23 compares both parity bits in order to check whether data was correctly stored in the scan address register (SADR) 13 or not. If there is an error, an error signal indicating mismatching of both parity bits sets to the flip-flop 24 of an error latch circuit. The error signal output by the flip-flop 24 is sent to SVP 1 by the error signal line 36.

Next, the address of each scan-out circuit to be diagnosed, as defined by 14 bits (13–15 and 21–31) in the scan address register (SADR) 3 enters the parity generator 20 through the switching gate circuit 29 and the corresponding parity bit is generated. This parity bit is input to the one input of the comparator 23. Simultaneously, this scan-out address is input to the parity generator 21 provided in each of the units CPU 3, CHP 4, MCU 5 and MSU 6 through the switching gate circuit 31 and the corresponding parity bit is generated. The parity bit generated by the parity generator 21 is sent to SCI 2 and then input to the other input of the comparator 23 through the switching gate circuit 30 within SCI 2. Here, it is compared with the parity bit input from the parity generator 20. If they do not coincide, an error signal is latched by the flip-flop 24, an error latch circuit. This error signal is sent to SVP 1 through the error signal line 36.

In this embodiment, a count register 27 is composed of 4 bits, the control gate 33 is opened by the clock signal at an interval of 50 ns supplied by the clock signal line 38, and thereby a count operation is carried out using an adder 26. When the contents of count register 27 becomes "0111", the set clock signal is generated by the decoder 28, and the set operation of flip-flop 24 is carried out.

When the contents of count register 27 circulates and the carry out signal is generated by the adder 26, the control gate 32 opens, and the contents of the scan address register (SADR) 13 are updated after being incremented by 1 in the adder 25. Thereby, the next scan-out address is generated and sent to each of the units CPU 3, CHP 4, MCU 5 and MSU 6. Thereafter, the scan addresses are sequentially generated in SCI 2 in the same way and the scan-out operation is executed. The error check processing of the scan-out address is executed for each transmission of the scan-out address.

The time chart of FIG. 4 illustrates the timing of these operations. Updating of the scan address register (SADR) 13 is carried out every 800 ns which is 50 ns (clock period) × 16 (maximum counter value of counter register 27). Regarding the scan-out data sent from each device, there is a fluctuation in the amount of time which passes until the scan-out data is sent to SCI 2 because of physical differences and their position relative to SCI 2. In the case of the example of FIG. 4, the minimum time until transmission of the scan-out data after transmission of the scan-out address is 200 ns and the maximum time is 300 ns. Namely, there is a fluctuation of 100 ns. For this reason, as explained above, the set clock signal input to the flip-flop 24 is generated when the value of the count register 27 becomes "0111" after transmission of the scan-out address, or after 350 ns.

Each unit, after receiving a scan-out address, branches the scan address signal as illustrated in FIG. 2 and then supplies the scan address signal to a plurality of circuits. Therefore, the error detecting function of a diagnostic circuit can be fulfilled by providing many parity bit generators (corresponding to parity generator 21 in FIG. 3) at the respective branching destinations.

As described above, this invention is capable of detecting an error in the output data of the scan-out circuit. Therefore, a notable effect can be obtained, namely not only can adequate maintenance work be completed, but also a serious problem due to alternative execution of an instruction using erroneous data can be prevented.

We claim:

1. A data processing scan-out system using scan-out address information for selecting a circuit to be diagnosed in a scan-out operation, comprising:
   a first unit, comprising:
     sending means for sending the scan-out address;
     first error check information generating means, operatively connected to said sending means, for generating first error check information from the scan-out address information;
     comparison means, operatively connected to said first error check information generating means, for generating a comparison output indicating error in the scan-out operation;
     a scan-out address register, operatively connected to said sending means and said first error check generating means, for holding the scan-out address information;
     first adder means, operatively connected to said scan-out address register, for incrementing the content of said scan-out address register;
     a count register for counting time;
     second adder means, operatively connected to said count register, for incrementing the content of said count register;
     controlling gate means, operatively connected to said first adder and said scan-out address register, for controlling the incrementing of the content of said scan-out address register;
     decoder means, operatively connected to said count register, for decoding the content of said count register and for generating a set clock signal; and
     a flip-flop, operatively connected to said comparison means and said decoder, for holding the comparison output of said comparison means until the set clock signal is received from said decoder means;
   a second unit, operatively connected to said sending means and said comparison means of said first unit, comprising a second error check information generating means for generating second error check information from the scan-out address information and for sending the error check information to said comparison means in said first unit, said comparison means in said first unit comparing the first error check information generated by said first unit with the second error check information sent from said second unit to produce the comparison output; and a third unit, operatively connected to said scan-out address register and said flip-flop in said first unit, for generating initial scan-out address information and for receiving the comparison output, said scan-out address register in said first unit receiving the initial scan-out address information from said third unit and said flip-flop in said first unit sending the comparison output to said third unit during the scan-out operation.

2. A data processing scan-out system according to claim 3, wherein said first unit further comprises third error check information generating means, operatively connected to said comparison means and said third unit, for generating third error check information based on the initial scan-out address information sent from said third unit, said comparison means comparing the third error check information from said third error check information generating means with the first error check information generated by said first error check information generating means.

3. A scan address checking system in a data processing system having a device to be scanned and a scan function, the data processing system providing an input scan address to said scan address checking system, said scan address checking system comprising:

a scan address register, operatively connected to receive the input scan address, for storing a registered scan address and providing an operation scan address to the device; and comparison means for comparing the input scan address with the registered scan address and for comparing the register scan address with the operation scan address provided to the device and providing a comparison output indicating whether the register scan address matches the input scan address and the operation scan address, said comparison means comprising:

a first parity generator in the device to be scanned, operatively connected to said scan address register, for generating a first parity signal;

a second parity generator, operatively connected to said scan address register, for generating a second parity signal;

a third parity generator, operatively connected to receive the input scan address, for generating a third parity signal; and a parity comparator, operatively connected to said first, second and third parity generators, for comparing the first and third parity signals with the second parity signal.

4. A scan address checking system in a data processing system having a device to be scanned and a scan function, the data processing system providing an input scan address to said scan address checking system, said scan address checking system comprising:

a scan address register, operatively connected to receive the input scan address, for storing a registered scan address and providing an operation scan address to the device;

comparison means, operatively connected to said scan address register and to receive the input scan address, for comparing the input scan address with the registered scan address and for comparing the registered scan address with the operation scan address provided to the device and providing a comparison output indicating whether the registered scan address matches the input scan address and the operation scan address, said comparison means comprising:

a first parity generator in the device to be scanned, operatively connected to said scan address register, for generating a first parity signal;

a second parity generator, operatively connected to said scan address register, for generating a second parity signal;

a third parity generator, operatively connected to receive the input scan address, for generating a third parity signal; and a parity comparator, operatively connected to said first, second and third parity generators, for comparing the first and third parity signals with the second parity signal;

first gate means, operatively connected to said scan address register and said second parity generator, for selecting portions of the registered scan address for input into said second parity generator; and second gate means, operatively connected to said first and third parity generators and said parity comparator, for selecting between said first and third parity generators for input to said parity comparator.

5. A scan address checking system in a data processing system as set forth in claim 4, further comprising address update means, operatively connected to said scan address register and said parity comparator, for incrementing the register scan address in said scan address register and for storing the comparison output.

6. A scan address checking system in a data processing system as set forth in claim 5, wherein said address update means comprises:

a first adder operatively connected to said scan address register;

a first control gate, operatively connected to said first adder and said scan address register, for updating said scan address register;

a count register;

a second adder operatively connected to said count register and said first control gate;

a second control gate operatively connected to said count register and said second adder;

a decoder operatively connected to said count register; and a flip-flop, operatively connected to said parity comparator and said decoder, for holding the comparison output.

* * * * *